D. R. BOWEN AND C. F. SCHNUCK.
MACHINE FOR MIXING OR MASTICATING RUBBER AND LIKE MATERIALS.
APPLICATION FILED OCT. 29, 1920.

1,424,445.

Patented Aug. 1, 1922.
3 SHEETS—SHEET 1.

D. R. BOWEN AND C. F. SCHNUCK.
MACHINE FOR MIXING OR MASTICATING RUBBER AND LIKE MATERIALS.
APPLICATION FILED OCT. 29, 1920.
1,424,445.
Patented Aug. 1, 1922.
3 SHEETS—SHEET 2.
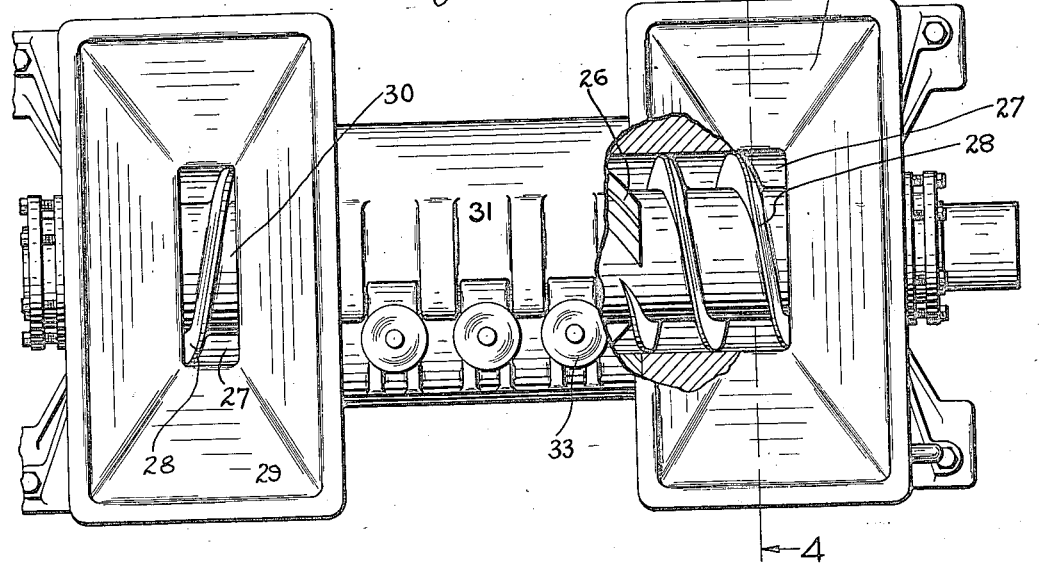
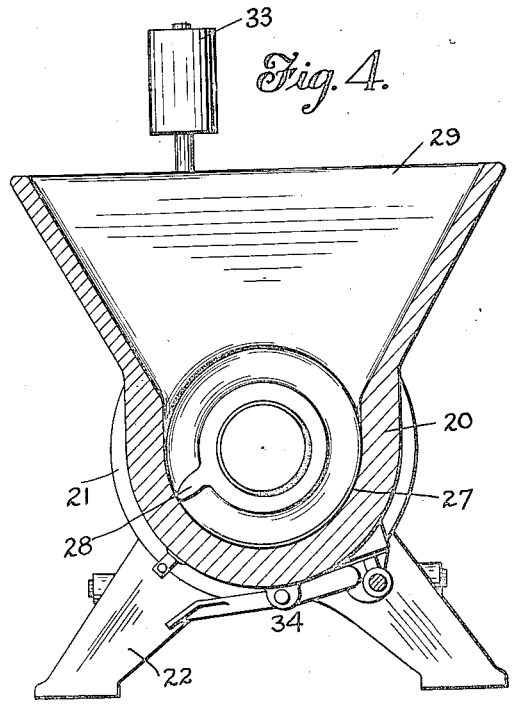
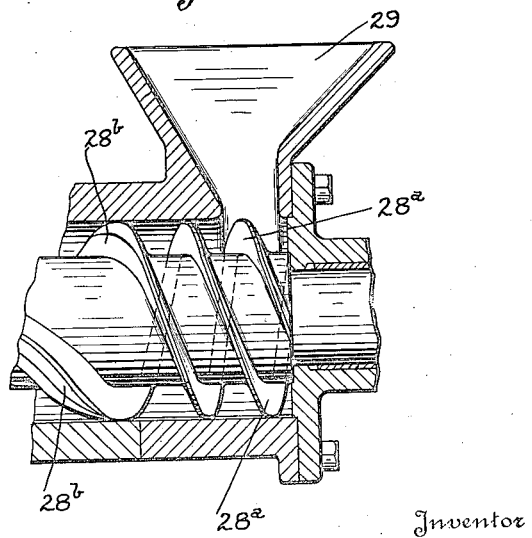

D. R. BOWEN AND C. F. SCHNUCK.
MACHINE FOR MIXING OR MASTICATING RUBBER AND LIKE MATERIALS.
APPLICATION FILED OCT. 29, 1920.

1,424,445.

Patented Aug. 1, 1922.
3 SHEETS—SHEET 3.

Inventor
D. R. Bowen and C. F. Schnuck,
By
Attorney

UNITED STATES PATENT OFFICE.

DAVID REES BOWEN, OF ANSONIA, AND CARL FREDERIC SCHNUCK, OF NEW HAVEN, CONNECTICUT, ASSIGNORS TO FARREL FOUNDRY & MACHINE COMPANY, OF ANSONIA, CONNECTICUT.

MACHINE FOR MIXING OR MASTICATING RUBBER AND LIKE MATERIALS.

1,424,445. Specification of Letters Patent. Patented Aug. 1, 1922.

Application filed October 29, 1920. Serial No. 420,390.

*To all whom it may concern:*

Be it known that we, DAVID R. BOWEN and CARL F. SCHNUCK, both citizens of the United States, the first residing in Ansonia and the second residing in New Haven, county of New Haven, State of Connecticut, have invented certain new and useful Improvements in Machines for Mixing or Masticating Rubber and like Materials, of which the following is a full, clear, and exact description.

This invention relates to machines for mixing or masticating rubber and similar material, and it has special reference to machines for compounding rubber, that is, for producing an intimate mixture of the rubber with sulphur, lamp black, whiting or the like. Usually the rubber is in rather large chunks and the material to be worked into the same is in the form of a powder.

One of the primary objects of our invention is to furnish a machine whereby an intimate and homogeneous mixture of a given amount of material can be effected in a relatively short time.

The machine is also useful in the mastication of rubber or some other substance, along, that is, for working a stiff mass, with or without the application of heat, until it is rendered plastic and homogeneous.

One of the most important objects of the invention is the provision of a machine of the general character described, having a large capacity and, more particularly, a machine in which the mixing or working chamber can be charged very expeditiously and conveniently. The batch of material to be operated upon can be charged into the working chamber very rapidly and with a minimum amount of physical labor.

To these and other ends the invention consists in the novel features and combinations of parts to be hereinafter described and claimed.

In the accompanying drawings:

Fig. 3 is a top plan view of the machine with certain parts broken away;

Fig. 4 is a section on line 4—4 of Fig. 3;

Fig. 5 is a fragmentary longitudinal vertical section of a machine of somewhat modified form;

Figure 1:
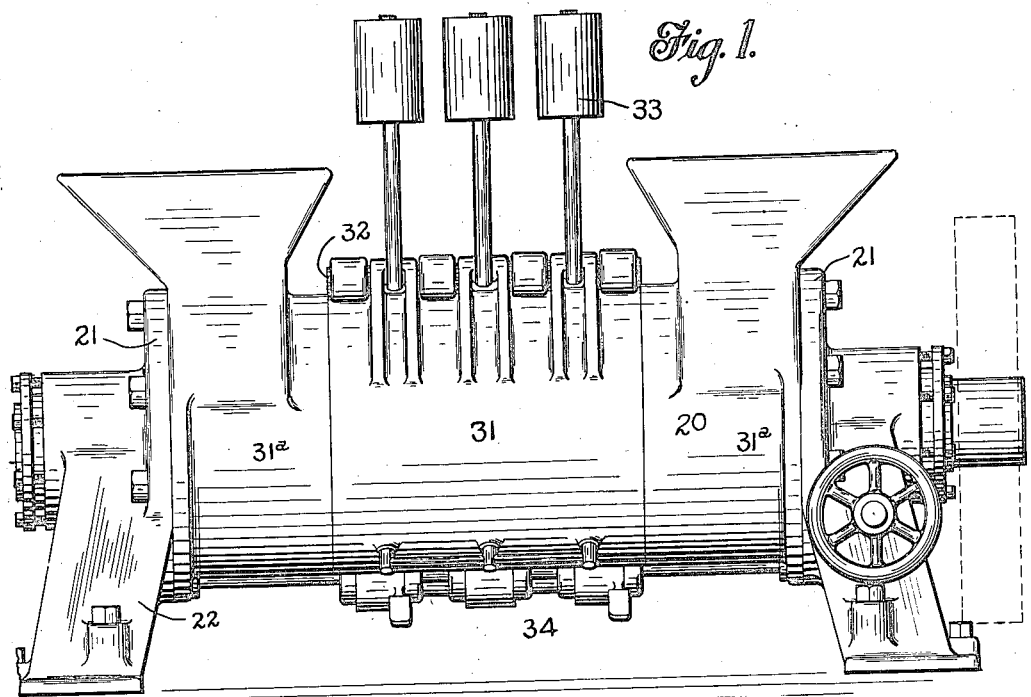
Fig. 1 is a front elevation of a rubber mixer embodying our improvements.

We have shown our improvements as applied to a machine of the single cylinder type, having a single rotor provided with blades for working the material back and forth in a substantially cylindrical working chamber; but in certain aspects the invention is applicable to machines of other type, such as machines having a duplex chamber for example. We have also shown our improvements applied to a mixer having a casing and rotor that are similar in some respects to those shown in our application, Serial No. 341,141, filed November 28th, 1919, where the main or middle part of the casing consists of two sections hinged together at the top and having suitable fastening means for securing their lower edges together when the working chamber is closed; but variation may be made in these particulars, also.

Referring particularly to Figs. 1 to 4, it will be seen that a substantially cylindrical casing 20 is provided, having end frames or heads 21 at the ends. These end frames or heads are bolted to the cylindrical part of the casing and are provided with legs 22 which rest on the floor. Journalled in bearings 23, 24 on the respective heads is a shaft 25 provided with blades 26 and constituting a rotary element or rotor for working the material in the working chamber against the inner surface of the casing. The blades 26 are so formed and arranged that as the shaft 25 is rotated continuously in one direction the material in the chamber is picked up by the blade or blades in one end of the chamber, and, while being forcibly pressed and worked against the inner periphery of the chamber, is moved toward and past the center of the chamber into the other end portion thereof. Simultaneously the material in the last named end of the chamber, while being similarly worked against the inner periphery of the chamber, is forced or moved in an approximately reverse direction. In this manner the material while being worked, is alternately moved back and forth in the chamber. In the particular form shown two of the blades 26 are provided in each chamber end, such blades being diametrically arranged, as shown in our prior application above mentioned.

In the form shown in Figs. 1 to 4, the casing, generally indicated by reference character 20, is extended longitudinally beyond the ends or boundaries of the working chamber proper, that is, the chamber where the blades 26 work the material against the inner periphery of the chamber. By thus extending the casing, feed or charging chambers or containers 27 are provided at the casing ends and between the working chamber and the respective heads 21. These feed or charging chambers 27 are also cylindrical and in line with the working chamber and in the form shown they are all substantially the same diameter as the working chamber. The rotor shaft extends through them as well as through the working chamber.

In the form shown in Figs. 1 to 4, the feed chambers 27 are provided interiorly with feed or charging devices for moving the material to be treated into the working chamber at the respective ends thereof. The working chamber may be charged at either or both ends, as desired, and the movement of the material into such chamber is brought about positively by mechanical means, with the object of expediting the charging of the machine and diminishing the manual labor incident to the charging of the machine. In the form under discussion this is brought about by providing within each of the feed chambers a feed screw. The feed screw may advantageously consist of a helical blade cast as a part of the rotor and located on the rotor hub within the corresponding feed chamber 27 and in the space between the adjacent working or mashing blade 26 and the corresponding end bearing portion of the shaft.

The material to be charged into the machine is introduced into either or both of two charging hoppers 29, located at the respective ends of the casing and communicating with the respective feed chambers 27. In the form shown in Figs. 1 to 4, these charging hoppers are located at the top of the casing and communicate with the corresponding feed chambers by openings 30, the axes of which are substantially vertical. These openings 30 are located closely adjacent the respective cylinder heads 21, that is to say, they communicate with the interior of the casing at points which are located at the outer parts of the feed chambers.

Figure 2:
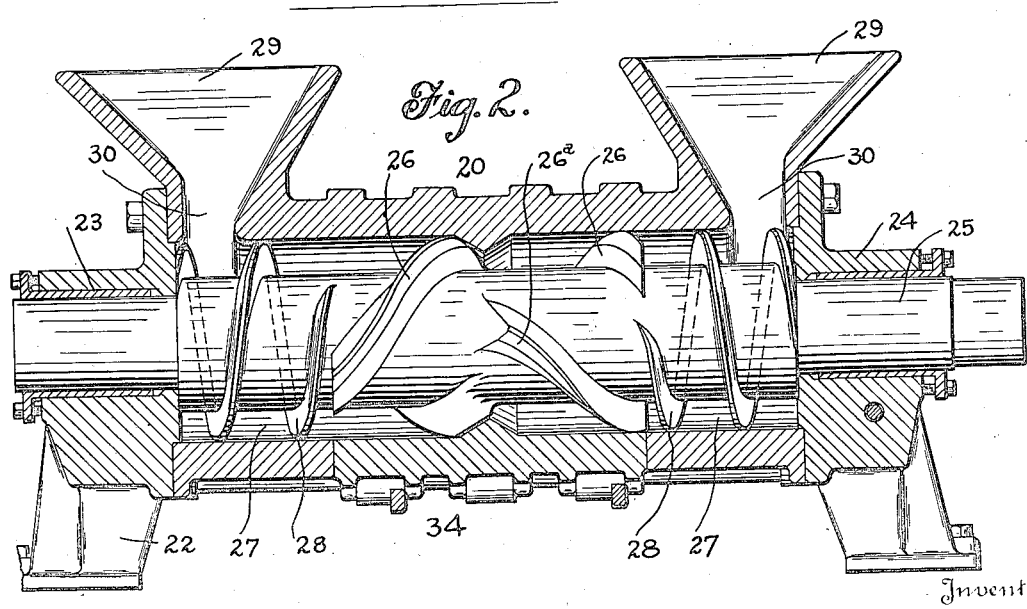
Fig. 2 is a vertical longitudinal section of the same.

The working blades 26 have faceted surfaces $26^a$, which mash the rubber or other material against the inner periphery of the casing so as to work it thoroughly while the batch is being moved back and forth in the working chamber. These blades may be arranged on the rotor axis at an angle of say approximately 45°. The feeding blades 28 on the other hand are arranged at a greater angle to the shaft axis, as shown in Fig. 2. The pitch of the feed blades, if considered as being the length measured along the axis of a complete turn, (as in the case of propeller screws) is rather small compared to that of the working blade. These feed blades moreover, in the form shown in Figs. 2 and 3, do not have any appreciable tendency to force the material outwardly toward the periphery of the casing. On the other hand the feed blades have substantially flat or undercut faces that are adapted to push the material lengthwise of the corresponding feed chamber, so that the material taken in at the end of such feed chamber by way of the opening 30 will be moved lengthwise of such chamber in a positive manner and forced positively into the sphere of action of the adjacent working blades 26. In this manner the material is charged into the working chamber positively at one or both ends by the feed blades, which rotate with the rotor and carry the material quickly into the end of the working chamber where it will be acted upon by the blades 26. When the material has once entered the working chamber it is worked and manipulated by the blades 26 while being forced back and forth in the working chamber. It cannot be forced lengthwise out of the working chamber, due to the fact that the feed blades prevent such action. These feed blades are turning throughout the operation of the machine and they are useful in charging in new material for the batch at any time and they prevent, as above stated, any escape of material from the ends of the working chamber. Furthermore, these feed blades, inasmuch as they substantially fill the space between the rotor hub and the inner periphery of the chamber, cut off the working chamber from the hoppers and thus prevent the escape of dust from the working chamber into the hoppers.

When the material is charged into one of the hoppers, whether such material be rubber chunks or powder, or both, it will be immediately taken up by the rotating feed blade beneath the hopper and carried quickly into the working chamber.

For discharging the machine the casing is provided with a hinged section 31, which may be swung to an open position. This casing section 31 is hinged to the fixed casing section 32 and is provided with counterweighting means 33 substantially as described in our application Serial No. 341,141. Furthermore, appropriate locking means 34, such as described in that application, are provided for securing the two sections of the casing together at the bottom when the working chamber is closed. In the particular form shown, the discharging means comprises a hinged section located at the front of the machine, hinged at the top, and co-extensive with the working chamber, said hinged section being adapted for swinging movement in an upward direction when the machine is to be discharged, and being located intermediate the fixed casing portions 31$^a$, in which the feed chambers 27 are located. Various changes may be adopted in these respects, however, without departing from the scope of the invention.

In the form shown in Fig. 5, the feed blade 28$^a$ is joined to one of the rotor blades 28$^b$ and in effect merges into the same. In this case there are two of the feed blades 28$^a$ and two working blades 28$^b$ in each half of the casing. This differs from the particular form shown in Fig. 2, wherein only one feed blade is employed in connection with the two working blades, the inner terminal of the feed blade being located at a point just about halfway between the outer terminals of the working blades.

Figure 6:
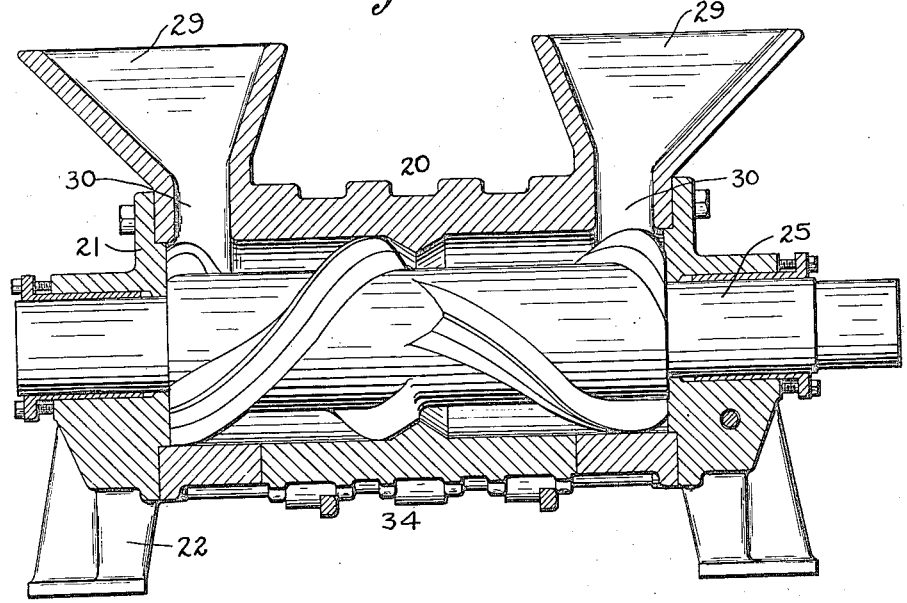
Fig. 6 is a vertical longitudinal section of a machine of still further modified form.

In the form shown in Fig. 6, the working blades are continued to the respective ends of the working chamber without change in their form. The hopper arrangement is substantially the same as that shown in Figs. 2, 3, 4 and 5. Those portions of the working blades, which are located in the extreme ends of the casing, act as feeding-in blades as well as working blades. In this case the openings 30, whereby the hoppers 29 communicate with the working chamber, have substantially vertically directed axes and may be of substantially rectangular contour, as shown in Fig. 3, for example. Such an arrangement facilitates greatly the charging of the machine. The charging opening 30 is in the cylindrical part of the casing wall in this form, but is located at points closely adjacent the cylinder head. It has been found that in this form of machine it is not necessary to close the openings 30 during the operation of the machine, as the working blades continually force the material toward the center of the rotor and prevent the escape of any appreciable amount of material from the ends of the working chamber. By providing the machine with hoppers at both ends feeding into the working chamber from above, the capacity of the machine is greatly increased. It can be charged in a very short time by simply dumping the rubber chunks and the powder into one or both of the hoppers. This material passes from the hoppers into the casing by gravity and by the drawing-in action of the blades on the rotor. The machine is of very simple construction and no special means, such as a pressure piston or follower, is required for holding the material against the rotor blades during the mixing operation.

Figure 7:
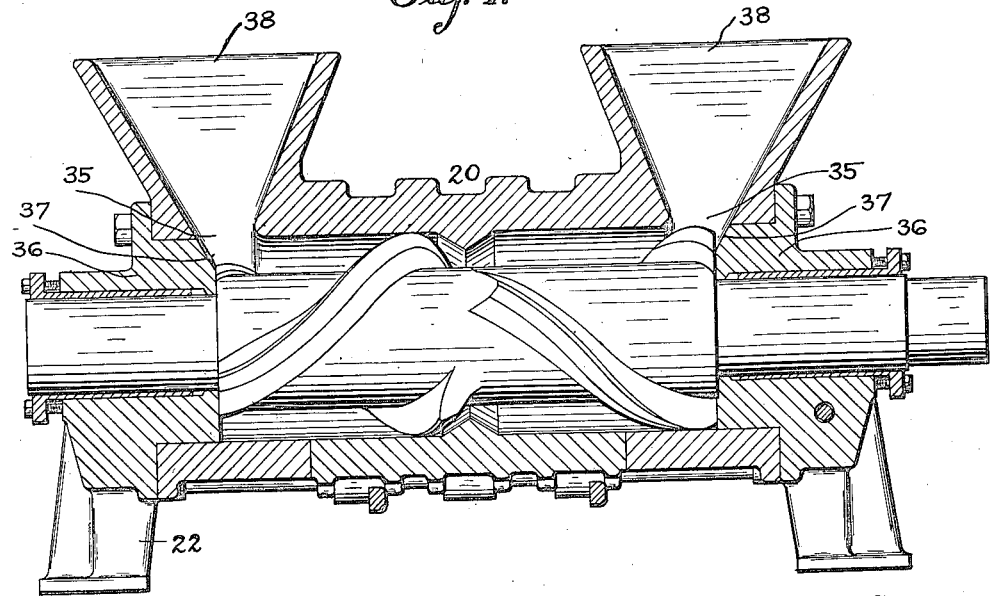
Fig. 7 is a similar view of a further modification.

In the form shown in Fig. 7, the hoppers 38 are generally similar to those previously described, but the openings 35 whereby they communicate with the respective ends of the working chamber are in a somewhat different location. In this modification the material entering the chamber from the hopper is not only permitted to move in at right angles to the axis of the chamber, as in the cases previously described, but it is also permitted to move into the chamber at the extreme ends, so that it can pass into the space between the rotating blades in a somewhat endwise direction. In this case the charging opening is located partly in the cylindrical portion of the casing and partly in the head 36 of the working cylinder. The head 36 is cut away slightly, as shown at 37, in order to increase the size of the charging opening and expedite the entrance of the material being charged into the machine.

Various changes may be made in the details of construction of the machine without departure from the scope of our invention as defined in the claims.

It will be understood that in all of the forms shown there is provided a substantially cylindrical mixing chamber having its axis approximately horizontal and provided at the ends with heads closing said chamber, a rotor journalled in said heads and having blades for working the material from the ends of the chamber toward the center, and hoppers located above the chamber at the respective ends thereof and communicating with the interior of the chamber by openings extending through the upper curved wall of the latter.

We do not claim broadly herein the provision of hoppers for the feeding in of the material at either or both ends of the mixing chamber, or other features broadly claimed in our application, Serial No. 341,141. Furthermore, we have not deemed it necessary to describe certain features shown in the drawing for producing an extrusion of the material at the central portion of the casing, inasmuch as these features are described and claimed in other applications. Likewise we do not claim broadly herein a rubber mixer comprising a casing with a substantially circumferentially continuous inner mixing surface, and a rotor for working the mass against and around said surface and simultaneously shifting different portions of the mass from the ends of the chamber toward the center thereof, as claimed in our application, Serial No. 458,222; nor do we claim herein a rubber working or similar machine having a working chamber consisting of an elongated single cylinder provided with a substantially continuous circumference and with an end charging opening through which the material to be mixed moves by gravity directly into the chamber, in combination with means for working the material back and forth in said chamber, as claimed in our application Serial No. 535,651; nor do we claim herein features pertaining to the rotor bearings, as claimed in our application Serial No. 423,365.

What we claim is:

1. In a machine of the character described, a working chamber, a rotor therein for working the material back and forth, and means for forcing the material positively into the working chamber at the respective ends.

2. In a machine of the character described, a working chamber, a rotor therein, and means for positively forcing the material to be treated into the working chamber at both ends.

3. In a machine of the character described, a working chamber, a bladed rotor therein, and means in connection with the rotor for forcing the material into the chamber at both ends.

4. In a machine of the character described, a working chamber, a bladed rotor therein for working the material, and means forming a part of the rotor for feeding the material positively into the working chamber at both ends.

5. In a machine of the character described, a working chamber, a rotor therein for working the material back and forth, and means forming a part of the rotor for feeding the material positively into the working chamber at at least one end.

6. In a machine of the character described, a working chamber, a rotor therein for working the material back and forth, and means forming a part of the rotor for feeding the material positively into the working chamber at at least one end, comprising a feed screw on the rotor.

7. In a machine of the character described, a working chamber, a rotor therein for working the material back and forth, and feed blades on the rotor at the respective ends thereof for feeding the material positively into the working chamber.

8. In a machine of the character described, a mixing chamber, a rotor therein having blades for working the material back and forth, and a hopper located above the chamber and communicating therewith by an opening located at the periphery of the chamber and closely adjacent one end therof.

9. In a machine of the character described, a mixing chamber having a curved side wall and provided with heads at the respective ends, a bladed rotor in said chamber for working the material back and forth, and a hopper located above the chamber communicating therewith by an opening through the curved wall of the chamber closely adjacent one of said heads.

10. In a machine of the character described, a mixing chamber, a bladed rotor therein for working the material back and forth, and hoppers on top of the chamber adjacent the respective ends thereof.

11. In a machine of the character described, a mixing chamber, a bladed rotor therein for working the material back and forth, and hoppers on top of the chamber adjacent the respective ends thereof and communicating with the interior of the chamber by way of openings extending through the upper wall of the chamber.

12. In a machine of the character described, a substantially cylindrical chamber having its axis approximately horizontal, said chamber having heads at the respective ends, a rotor in the chamber for working the material back and forth, and a hopper located above the chamber and communicating therewith by an opening whose axis is substantially vertical and which is located adjacent one of said heads.

13. In a machine of the character described, a substantially cylindrical mixing chamber having its axis approximately horizontal and provided at the ends with heads closing said chamber, a rotor journalled in said heads and having blades for working the material from the ends of the chamber toward the center, and hoppers located above the chamber at the respective ends thereof and communicating with the interior of the chamber by openings extending through the upper curved wall of the latter.

14. In a machine of the character described, a substantially cylindrical mixing chamber having its axis approximately horizontal and provided at the ends with heads closing said chamber, a rotor journalled in said heads and having blades for working the material from the ends of the chamber toward the center, and hoppers located above the chamber at the respective ends thereof and communicating with the interior of the chamber by openings extending through the upper curved wall of the latter, said openings being located closely adjacent the respective heads.

15. In a machine of the character described, a substantially cylindrical casing having its axis approximately horizontal, a bladed rotor in said casing for working the material from the ends thereof toward the center, and a hopper above the cylinder at the end thereof communicating with the interior of said cylinder by an opening through which the material may be charged by gravity.

16. In a machine of the character described, a substantially cylindrical casing having its axis approximately horizontal, a bladed rotor in said casing for working the material from the ends thereof toward the center, and a hopper above the cylinder at the end thereof communicating with the interior of said cylinder by an opening through which the material may be charged by gravity, said opening being located in the upper portion of the cylindrical wall of the cylinder.

17. In a machine of the character described, a substantially cylindrical casing, a bladed rotor therein for working the material back and forth, and a gravity feed hopper on top of the casing, communicating with the same through a top opening in the casing.

18. In a machine of the character described, a cylindrical casing having a gravity feed hopper communicating with the same by an opening through the upper wall of the casing, and a rotor in said casing for working the material back and forth therein against the inner surface thereof.

19. In a machine of the character described, a cylindrical casing having a gravity feed hopper communicating with the same by an opening through the upper wall of the casing, and a rotor in said casing for working the material back and forth therein against the inner surface thereof, said opening being located adjacent one end of the casing.

20. In a machine of the character described, a mixing chamber consisting of a single cylinder having a gravity-feed opening in the end portion of the upper wall thereof, and means for working the material back and forth in the chamber.

21. In a machine of the character described, a casing consisting of a single cylinder having a gravity feed hopper communicating therewith by an opening through the upper wall of the casing, and a bladed rotor in said cylinder for working the material back and forth therein.

In witness whereof, we have hereunto set our hands on the 25th day of October, 1920.

DAVID REES BOWEN.
CARL FREDERIC SCHNUCK.